United States Patent
Akyamac et al.

(10) Patent No.: US 8,913,481 B2
(45) Date of Patent: Dec. 16, 2014

(54) METHOD AND SYSTEM FOR EFFICIENT PROVISIONING OF MULTIPLE SERVICES FOR MULTIPLE FAILURE RESTORATION IN MULTI-LAYER MESH NETWORKS

(75) Inventors: Ahmet A. Akyamac, Bridgewater, NJ (US); Gary W. Atkinson, Freehold, NJ (US); Ramesh Nagarajan, Princeton Junction, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2088 days.

(21) Appl. No.: 11/772,143

(22) Filed: Jun. 30, 2007

(65) Prior Publication Data

US 2009/0003211 A1  Jan. 1, 2009

(51) Int. Cl.
*G01R 31/08* (2006.01)
*H04L 12/24* (2006.01)
*H04J 14/02* (2006.01)
*H04L 12/911* (2013.01)
*H04L 12/927* (2013.01)
*H04L 12/54* (2013.01)
*H04L 12/703* (2013.01)
*H04L 12/707* (2013.01)
*H04L 12/801* (2013.01)
*H04Q 11/00* (2006.01)

(52) U.S. Cl.
CPC ........ *H04Q 11/0062* (2013.01); *H04L 41/0681* (2013.01); *H04Q 2011/0084* (2013.01); *H04L 41/0663* (2013.01); *H04J 14/0293* (2013.01); *H04J 14/0289* (2013.01); *H04Q 2011/0073* (2013.01); *H04J 14/0284* (2013.01); *H04L 47/728* (2013.01); *H04L 47/805* (2013.01); *H04L 12/5695* (2013.01); *H04Q 2011/0079* (2013.01); *H04L 41/12* (2013.01); *H04L 45/28* (2013.01); *H04Q 2011/0081* (2013.01); *H04Q 2011/0086* (2013.01); *H04L 45/22* (2013.01); *H04L 47/10* (2013.01)
USPC ............ 370/216; 370/241; 370/222; 370/406

(58) Field of Classification Search
None
See application file for complete search history.

(56) References Cited

U.S. PATENT DOCUMENTS

| | | | |
|---|---|---|---|
| 6,725,401 B1* | 4/2004 | Lindhorst-Ko | 714/47 |
| 7,039,009 B2* | 5/2006 | Chaudhuri et al. | 370/225 |
| 7,061,919 B1* | 6/2006 | Anschutz | 370/395.43 |
| 7,280,755 B2* | 10/2007 | Kang et al. | 398/7 |
| 2002/0097461 A1* | 7/2002 | Patel et al. | 359/110 |
| 2002/0176131 A1* | 11/2002 | Walters et al. | 359/118 |
| 2002/0194339 A1* | 12/2002 | Lin et al. | 709/226 |
| 2003/0018812 A1* | 1/2003 | Lakshminarayana et al. | 709/241 |
| 2003/0048749 A1* | 3/2003 | Stamatelakis et al. | 370/225 |
| 2003/0065811 A1* | 4/2003 | Lin et al. | 709/232 |
| 2003/0169692 A1* | 9/2003 | Stern et al. | 370/242 |
| 2004/0004938 A1* | 1/2004 | Buddhikot et al. | 370/238 |
| 2004/0052207 A1* | 3/2004 | Charny et al. | 370/216 |
| 2004/0057375 A1* | 3/2004 | Shiragaki et al. | 370/216 |
| 2004/0114512 A1* | 6/2004 | Johri | 370/225 |
| 2004/0151498 A1* | 8/2004 | Tanobe et al. | 398/45 |
| 2004/0205239 A1* | 10/2004 | Doshi et al. | 709/241 |
| 2004/0208547 A1* | 10/2004 | Sabat et al. | 398/50 |
| 2004/0208549 A1* | 10/2004 | Rutledge et al. | 398/50 |
| 2004/0233843 A1* | 11/2004 | Barker | 370/225 |
| 2004/0258409 A1* | 12/2004 | Sadananda | 398/50 |

(Continued)

*Primary Examiner* — Huy D Vu
*Assistant Examiner* — Zewdu A Beyen
(74) *Attorney, Agent, or Firm* — Wall & Tong, LLP

(57) ABSTRACT

A method and system for efficiently provisioning a multiple service, multiple layer mesh network in a manner enabling restoration from multiple failures.

10 Claims, 13 Drawing Sheets

(56) References Cited

U.S. PATENT DOCUMENTS

| | | |
|---|---|---|
| 2005/0232144 A1* | 10/2005 | Doverspike et al. .......... 370/216 |
| 2005/0243711 A1* | 11/2005 | Alicherry et al. ............. 370/216 |
| 2006/0051090 A1* | 3/2006 | Saniee et al. .................... 398/59 |
| 2007/0280251 A1* | 12/2007 | Wang et al. ................ 370/395.1 |

\* cited by examiner

METHOD AND SYSTEM FOR EFFICIENT PROVISIONING OF MULTIPLE SERVICES FOR MULTIPLE FAILURE RESTORATION IN MULTI-LAYER MESH NETWORKS

BACKGROUND OF THE INVENTION

1. Field of the Invention

The present invention relates to communications networks and, more specifically, to multi-service provisioning and restoration functions within multi-layer mesh networks.

2. Description of the Related Art

The process of planning and provisioning bandwidth and capacity in modern large-scale mesh networks is a complicated one, even when one considers only one service that is unprotected. For example, constructing a quality routing solution of LSPs in MPLS networks is an NP-hard combinatorial optimization problem. This involves only the logical layer of the network. For networks with several tens of nodes and links and hundreds of demands, a mathematical optimization problem whose solution produces a feasible, not even optimal, routing and provisioning plan can require millions of variables to allow for possible routing combinations, thus making it mathematically intractable or computationally impractical to solve.

Real-world planning and provisioning problems are inherently much more complex, usually involving multiple services and a heterogeneous mix of protected and unprotected traffic requiring consideration of multiple layers (such as the logical and physical layers) of the network. The computational complexity of such a problem for any realistic sized network makes it impossible to formulate any type of complete end-to-end network planning and provisioning mathematical optimization problem that can be solved in any reasonable timeframe or with any reasonable expectation of quality of results. Faced with the task of solving such a problem, network designers and traffic engineers usually resort to problem decomposition in order to achieve a tractable approach to these complex problems. This includes modeling the problem by resorting to approximations to the real situation that captures the essence of the problem but whose solution does not sacrifice any meaningful characteristics or qualities of the desired solution. Getting quality solutions relies on being able to divide the problem into solvable parts, based on making certain assumptions. Thus, there is a difficult process of problem decomposition and model development to provide tractable subproblems that can be solved separately and, when the solutions are combined, provide meaningful results and a quality overall solution to provisioning of capacity and engineering the traffic in the network.

Additionally, network planning and capacity provisioning in the physical layer practice today is confined to considering protection against single node or link failures. Typically, such failures are assumed to occur randomly in a network, and with nodes configured in such a way that the probability is low of a multiple total node and/or link failure scenario. However, if failures are not necessarily random, such as in orchestrated attacks, or if node or link failures occur at a higher rate than currently assumed, then providing protection against single failures may not be adequate to provide a desired or required level of network availability. Also, critical ultra-high availability services require protection against multiple network failures.

However, due to the previously-mentioned computational complexities, provisioning for protection against multiple node or link failures is not practical and not performed in practice in complete network designs.

SUMMARY OF THE INVENTION

Various deficiencies in the prior art are addressed by the present invention of a method and system adapted to, for example, efficiently planning and provisioning fast, multi-service restoration from multiple failures in large-scale packet-over-optical mesh networks across multiple network layers. The method and system is based upon path protection of protected services, thus providing the basis for fast restoration. The method and system performs, in various embodiments, one or more of (1) aggregation and grooming of guaranteed bandwidth (GB) traffic, including the development of a grooming topology in the logical layer that provides for efficient capacity utilization and protection against grooming functionality failure in the logical or packet layer of the network, (2) routing and protection in the physical topology of wavelength services (WS) and GB wavelength circuits such as for the required protection level of each service in terms of the number of network-wide failures, (3) determination of capacity-efficient sharing of the required backup capacity, and (4) grooming and routing of best effort (BE) traffic, including the development of and efficient grooming topology.

One embodiment of the invention comprises a method of provisioning a network allowing path protection of protected services, the method comprising: creating a logical network topology for grooming guaranteed bandwidth (GB) traffic flows, the logical topology including high, medium and low traffic nodes; determining a routing solution of the GB traffic flows using the logical network topology to provide wavelength circuit (WC) requests (i.e., requests for end-to-end light paths) for each protection class; and adapting the logical network topology to a physical layer of the network to provide GB routing and protection in the physical layer.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
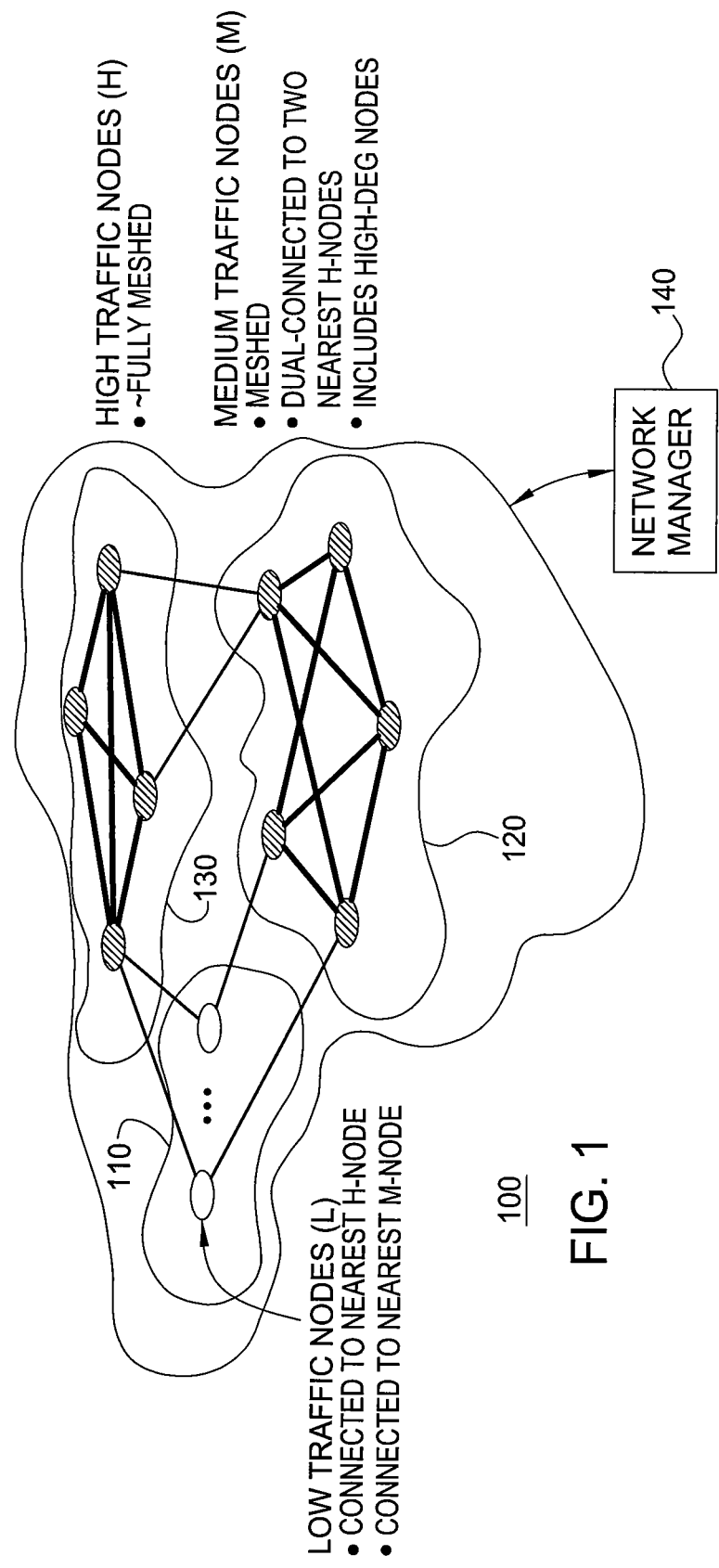
FIG. 1 depicts a high-level block diagram of a network benefiting from the subject invention.

The subject invention in one embodiment is a method and system process for efficiently planning and provisioning fast, multi-service restoration from multiple failures in large-scale packet-over-optical mesh networks across multiple network layers. The types of services include (1) wavelength services (WS) that consist of one or more co-propagating wavelengths required between a source and destination pair, and two types of packet services which are (2) guaranteed bandwidth (GB) services that consist of sub-wavelength traffic between source and destination pairs that will be provided a specified amount of bandwidth for transmission, and (3) best-effort packet traffic that consists of variable traffic demands between source and destination nodes but has no guarantee of bandwidth between the terminating nodes. The WS and GB traffic types are protected against one or more complete failures of nodes or links in the network up to k failures network-wide. The BE traffic is unprotected.

The process is based upon path protection of protected services, thus providing the basis for fast restoration. The process performs, in various embodiments, one or more of (1) aggregation and grooming of the GB traffic, including the development of a grooming topology in the logical layer that provides for efficient capacity utilization and protection against grooming functionality failure in the logical or packet layer of the network, (2) routing and protection in the physical topology of WS and GB wavelength circuits (i.e., end-to-end light paths) for the required protection level of each service in terms of the number of network-wide failures, (3) determination of capacity-efficient sharing of the required backup capacity, and (4) grooming and routing of the BE traffic, including the development of and efficient grooming topology.

The overall planning and provisioning problem is decomposed using optimization methodologies combined with novel techniques to provide an overall process that produces capacity-efficient plans for multi-service protection against multiple failures across multiple layers in the network. These novel techniques include the development of capacity-efficient grooming topologies for the GB and BE traffic services, primary and backup path selection among all the protected services with reduced conflicts in order to minimize link overloading, and techniques for protection capacity sharing such as failover ordering, primary reuse, protection release, and non-stratified sharing to promote efficient backup capacity utilization.

This process can be included as a (offline) service offering for initial network planning and provisioning and could also be incorporated as part of an online provisioning system. This includes in various embodiments (1) segregation of the traffic into protection tiers or classes, (2) the protection tier defined by the number of failures network-wide versus some other per-service quality-assurance based metric (like service annual availability), (3) the number of protection tiers, (4) path weights used for protection tier path deconfliction, (5) specifications for the grooming architecture, including whether to use groomer protection and, if so, what logical connectivity is required to provide it, (6) aspects of the shared protection, including whether to use protection release or primary reuse, and/or (7) the unique feature of backfilling lower protection tier traffic into residual bandwidth of higher tiers when its available.

FIG. 1 depicts a high-level block diagram of a network benefiting from the subject invention. Specifically, the network 100 of FIG. 1 includes a plurality of low traffic nodes 110, a plurality of medium traffic nodes 120, a plurality of high traffic nodes 130 and a network manager 140. It will be appreciated by those skilled in the art that the network 100 depicted in FIG. 1 is a simplified representation of a multi-player, multi-service network. More or fewer low, medium and/or high traffic nodes may be included, different topologies may be utilized and so on, all of which are contemplated to be managed within the scope of the present invention.

Each of the low traffic nodes is connected to (linked to) some number of nearest medium traffic nodes and/or high traffic node. Each of the medium traffic nodes are meshed with other medium traffic nodes and connected to (one or more) two nearest high traffic nodes. Each of a high traffic nodes are fully meshed with the other high traffic nodes. The network manager 140 is depicted as managing the entire network 100 from a remote location. However, it will be appreciated by those skilled in the art that the network manager 140 may be operatively coupled to one or more of the low, medium or high traffic nodes. Moreover, multiple network managers may be distributed throughout the network, which network managers then communicate and cooperate with each other to achieve the various functions described herein with respect to the present invention.

The network manager 140 comprises a computing system having, illustratively, input/output (I/O) functions, processing functions and memory functions wherein methodologies according to embodiments of the invention are represented in software stored in the memory and/or executed by the processor to invoke the methods according to the present invention.

The various embodiments of the invention described herein may be implemented within the context of methods, computer readable media and computer program processes. As such, it is contemplated that some of the steps discussed herein as software processes may be implemented within hardware, for example as circuitry that cooperates with the processor to perform various steps.

The invention may also be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a signal bearing medium such as a broadcast medium, and/or stored within a working memory within a computing device operating according to the instructions.

An apparatus in accordance with one embodiment of the subject invention may comprise a computer operating as part of a network management system (NMS) or element management system (EMS). The apparatus may be associated with one particular network element or multiple elements. The functionality discussed herein may be fully provided by one instance of the apparatus or multiple instances. Generally speaking, any computing device either within or without any of the nodes or network elements in the network may be employed to implement the methodologies of the present invention.

Introduction

Within the context of the present invention, a management methodology is disclosed for logically defining the overall problem and breaking the problem into sub-problems. Specifically, the invention will be described within the context of capacity-efficient, shared multi-service multi-failure protection. Generally speaking, the approach taken to organizing a decomposition of the problem simultaneously provides for the protection levels needed while being capacity efficient is to start and organize the design process around the requirements for multi-failure protection. One driver for this is the need to provide multi-failure protection for k-protected demands between nodes of degree k or more when graph connectivity allows. In terms of all the possible protection paradigms (path protection, local detours, . . . ), the inventors have deemed sufficient a condition that a k-protected demand be restorable is that there exist in the network topology k+1 node-disjoint paths between the terminating nodes. Any demand between such a pair of nodes is k-protectable. Additionally, treating each protection class separately initially ensures protection bandwidth is available to it without pre-empting, or being preempted by, another protection class. Finally, by proceeding in order from highest to lowest protection class, any residual bandwidth in a protection tier can be used to accommodate lower protection classes, thereby reducing the amount of traffic to be planned and protected in those lower classes.

All traffic in a protection class is protected against optical transport failures. This protection is provided in the optical transport layer through the use of node-disjoint path-protected wavelength circuits (WCs). Further, any IP traffic in a protection class that is groomed also must be protected against a single grooming node failure. This protection is designed in the grooming or logical layer. Thus, given a traffic matrix of point-to-point WS, GB, and BE demands for a specified protection level for each service, the following methodological steps provision capacity and engineer the traffic in the network, first in the logical (electronic) layer and then in the physical (optical) layer:

(I) GB Protection-Class Traffic Aggregation and Grooming (II) Routing and Protection in the Physical Topology (III) Backup Capacity Sharing Determination (IV) BE Traffic Grooming and Routing The protection class of a protected service is defined by the number of network-wide failures the service must be able to recover from and still provide service. Thus, a k-protected service must be protected against any combination of k node and link failures in the network. It is assumed any k-protected service is k-protectable. For purposes of description, it is assumed at most one node will fail along with any number of links. The process below is generalizable to multiple node failures.

I GB Protection-Class Traffic Aggregation and Grooming

Beginning with the highest protection class, individual GB demands are aggregated into point-to-point demands of no more than the line rate, R, of an individual optical wavelength. For the purpose of grooming, a logical topology is formed. It can be formed in a variety of ways.

One method for forming the logical topology is to define the logical topology as a subset of links implied by the point-to-point demands and other links designed to provide at least 2-connectivity of the logical topology as well as to distribute the grooming duties over the nodes. The 2-connectivity of this topology is used to provide for protection in the logical layer of the grooming functionality (routers) at the grooming nodes. Separating out the nodes terminating a relatively large amount of GB traffic ("H-nodes") and heavily meshing them allows nearly fully wavelengths to be directly connected between the source and destination nodes. Also, identifying and separating out the highly trafficked nodes allows for routes to be chosen that minimize use of these heavily-used nodes thereby mitigating congestion on the physical links terminating on or near those nodes.

A second tier of nodes terminating a relatively intermediate amount of GB traffic ("M-nodes") and partially meshing them provides for a similar efficiency in terms of node hops but would also be expected to have a comparatively larger amount of residual capacity per wavelength. Also, each M-node is linked to the two nearest H-nodes to provide the necessary logical connectivity for M-H connections, among others. Finally, each node in a third tier of nodes terminating the least amount of GB traffic ("L-nodes") is connected to the nearest H- and M-nodes to provide the needed L-L, L-M, and L-H connectivity. The use of nearest neighbor connectivity forces local aggregation for grooming and prevents stuffing wavelengths with suitable residual capacity that could cause large geographic transits of the graph, which in turn could generate excessive capacity allocation.

While are a number of approaches to grooming that may be employed within the context of solving the overall problem, a key insight of the inventors is that when grooming a high wavelength fill rate can result in a larger number of wavelength hops in the physical network as grooming opportunities are sought out. Thus, lower fill rates may be more capacity efficient in the fiber topology. The grooming heuristics disclosed herein attempts to balance these effects for optimal efficiency.

Aggregate point-to-point demands are then groomed by solving a flow-like cross-layer minimization problem formulated to capture the tradeoff between wavelength fill rate and hops in the physical layer. The optimization problem is formulated as a multi-commodity network flow problem over the logical topology, after which each node is failed and the problem resolved on the surviving sub-network and demands to determine the additional flow requirements for logical protection. Thus, the solution to this optimization problem also provisions suitable bandwidth in the logical layer for GB flow rerouting in the event of any single grooming node failure. Once formulated, this problem can be solved by a commercially available solver. Finally, any unused capacity in each point-to-point wavelength demand between two nodes may also be backfilled by direct connections of lower (<k) protection class GB traffic or BE flows (lowest protection class), in priority order of decreasing protection class, between the same node pair, if any. As these flows will be carried end-to-end on a k-protection class wavelength circuit, they will require no further protection. This process is repeated iteratively for any remaining traffic in the next (k−1) protection class and so on until all traffic has been groomed. The result is a set of WC (i.e., light path) demands to be protected according to the highest protection class present in each light path.

II Routing and Protection in the Physical Topology

The next step is route the light paths from the WS and GB traffic obtained in Step I with suitable protection as specified in the protection class of the highest service contained in each wavelength. Node-disjoint paths are employed for this failure protection. For each k-protected WS or GB wavelength demand, node-disjoint physical paths are constructed in the fiber layer according to the protection level: k+1 node-disjoint paths for each k-protected demand. Note that for a multi-wavelength WS demand, all wavelengths comprising the demand may be (optionally) bound to the same working path in a path set, In the event of a failure in the working path in this case, all wavelengths are switched in unison to an available backup path in the set.

There are a variety of ways to find k node-disjoint paths between two nodes in a graph. For the sake of capacity efficiency and avoidance of link overloading the inventors created a technique to choose path weights in a specific manner and then use those weights in a k-shortest path like algorithm. Generally speaking, when multiple node-disjoint paths are sought, the larger k is, the more limitations that are placed on finding distinct path choices between a given pair of nodes. The topology of the graph requires some links to be necessarily included in some of the path sets. Link overloading is avoided by determining link popularity in k-shortest path computations and then using those popularities as the link weights. Thus, when k node disjoint shortest paths are found for all the nodes, there will be less conflicts or overloads than when not taking link popularity into account.

For link popularities, one embodiment is to employ retraction between steps II and III. This approach is to complete step II based upon some initial link popularities (e.g., all links are equally popular) and Step III (see below) to determine the number of wavelengths that are used on each link. These link loadings can then be used as the link popularities to repeat Step II.

To efficiently solve the k-shortest path problem, one embodiment that is particularly amenable to an online application is to use a min-cost flow formulation. In this case, each node in the graph is split and arc capacities are set to unity and also have the link popularities as their costs. Then k units of flow are required between the source and destination nodes. Since the arcs between the split nodes have unit capacities the result will be k "shortest" unit flows that are node-disjoint paths. While such a min-cost flow formulation could readily be solved by a commercial solver, algorithms for solving min-cost network flows are computationally very efficient and could easily be implemented without a commercial solver.

III Backup Capacity Sharing Determination

Capacity utilization is improved by determining capacity sharing opportunities among all protection classes for all possible protection classes. After combining path sets for all GB and WS demands, a heuristic is used to determine the nominal (no failure) primary and backup path assignments for each demand's path set. There are multiple approaches to determining the failover order. The failover order is the order in which the multiple backups are activated.

In one embodiment of the invention, the collective set of all paths determined in Step II is used to solve a formulation of a combinatorial optimization problem that selects which of the paths are primary and secondary based on minimizing the total capacity for one or two failures. The remaining backup paths are then ordered arbitrarily. The rationale is that since demands that are at most 1- and 2-protected would make up the majority of the demands, these would have the greatest impact on the backup capacity utilization. Once formulated, solving this path ordering combinatorial optimization problem is more readily performed with, for example, a commercial solver.

Another embodiment is a heuristic that for each demand, incrementally adds each path and chooses the path as the primary that results in the least marginal addition of incremental required capacity to the network. This is dependent on the order in which the demands are added.

The design is then evaluated for capacity requirements. In one embodiment, this is achieved by iterating over all possible single, double, and triple failure scenarios and determining what wavelength circuits are unaffected and which are hit, in which case they are switched to their backup paths (if any), thus giving the maximum simultaneous wavelengths required on each link. This allows for efficiencies such as primary capacity reuse of failed demands, while enforcing rules such as no preemption of unaffected demands, including their backup, as long as the protection level is not exceeded. Simultaneous consideration of all the failure cases together results in substantial reduction in the amount of required protection capacity. Additionally, backup capacity can be further reduced by releasing the backup capacity reserved by a k-protected demand in a given failure scenario where the demand is not affected but k failures have occurred in the network.

IV BE Traffic Grooming and Routing

Finally, any remaining BE traffic is groomed as in Step I, and the resulting light paths are then routed in the residual fiber capacity network. Since the BE traffic is unprotected, the logical topology need not be 2-connected since there is no need to provide protection of the grooming functionality in the logical layer for BE traffic. The grooming of the expected BE traffic could be solved using a number of optimization formulations. To minimize the total number of fibers deployed, one embodiment of the invention solves a multicommodity flow problem modified to track the number of fibers required on each link and then minimize with respect to the total integer number of fibers required. The resulting problem is then optionally fed into and solved by a commercial combinatorial optimization solver.

If, at any step, the resulting intermediate capacity utilization is unsatisfactory, the process can backtrack to the previous step and that step repeated based on the unsatisfactory Step.

Detailed Description of Embodiments of the Invention

Figure 2:
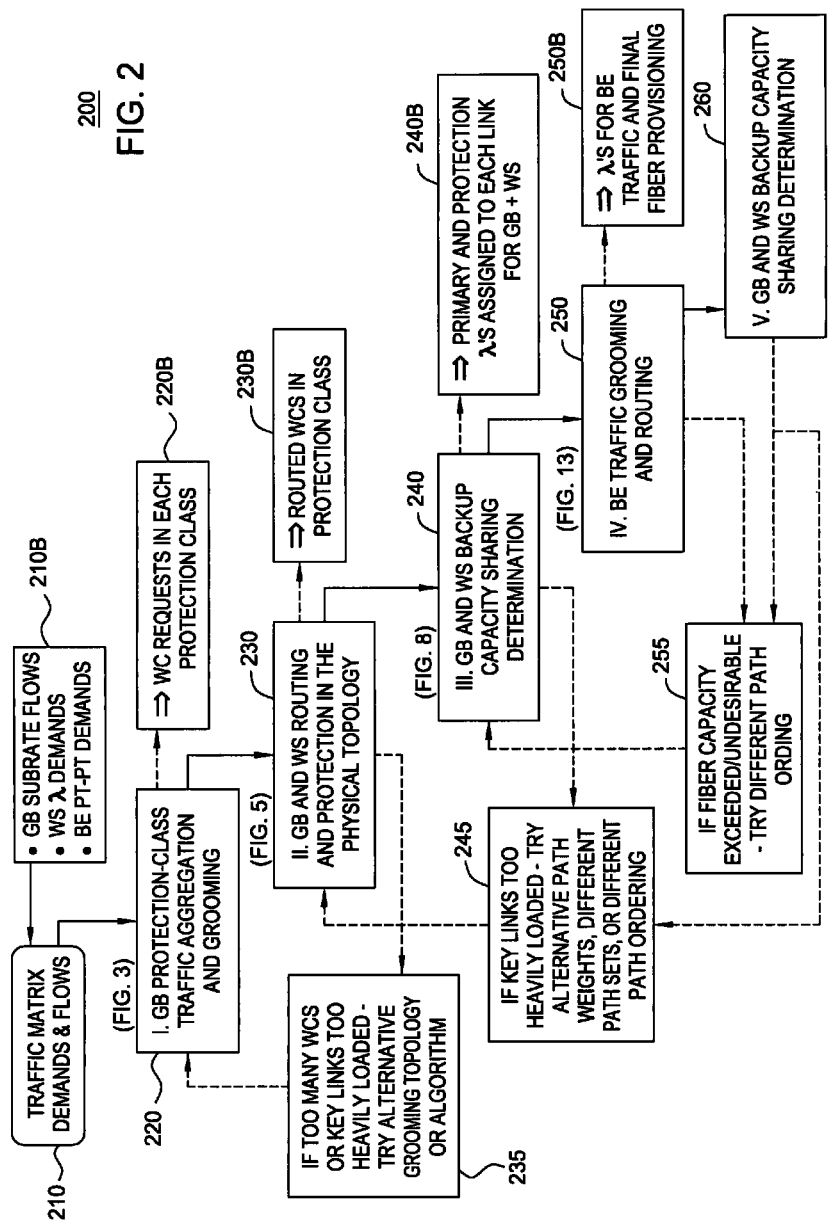
FIG. 2 depicts a flow diagram of a method for multi-service network planning and provisioning.

FIG. 2 depicts a flow diagram of a method for multi-service network planning and provisioning. Specifically, the method 200 of FIG. 2 comprises an overview of a multi-protection network design process with retraction.

The method 200 is invoked in response to, for example, receiving an indication of desired traffic matrix demands and flows, per step 210. Referring to box 210B, the information received at step 210 may comprise information relating to guaranteed bandwidth (GB) Internet protocol (IP) point-to-point demand flows, wavelength service (WS) such as multi-wavelength service point-to-point demand flows, best effort sub-rate IP point-to-point demand flows and of the like. In general, step 210 helps define a specific communication streams, their respective priority levels, their respective types and so on. Satisfying the requirements associated with the traffic matrix demands and flow information is addressed as defined below with respect to the present invention.

At step 220, a guaranteed bandwidth protection-class traffic aggregation and grooming process is performed. Generally speaking, at step 220 a logical network topology for grooming guaranteed bandwidth (GB) traffic flows is developed. The logical topology includes high, medium and/or low traffic nodes such as described in more detail with respect to FIG. 1. There may be more than three levels of nodes, although these three usually suffice. Additionally, a routing solution of the GB traffic flows is determined using the logical network topology to provide wavelength circuit (WC) requests for each protection class. Where the wavelength services are full-rate, their routes are determined in the physical layer at step 230I. Referring to box 220B, step 220 provides wavelength circuit (WC) requests in each protection class processed. The specific processing steps associated with step 220 will be discussed in more detail below with respect to FIG. 3.

At step 230, guaranteed bandwidth and wavelength service routing and protection in the physical topology processes are performed. Generally speaking, the logical topology and routing solution determined at step 220 is adapted to the physical layer of the network. Referring to box 230B, step 230 provides wavelength circuits (WCs) routed in the physical layer in each protection class processed. The specific processing steps associated with step 230 will be discussed in more detail below with respect to FIG. 4. Step 230 may fail when, per step 235, there are too many wavelength circuits or key links that are too heavily loaded, at which time an alternative grooming topology/algorithm is appropriate. Thus, if step 230 fails then the method 200 returns to step 220.

At step 240, a guaranteed bandwidth and wavelength service backup capacity sharing determination process is performed. Generally speaking, the maximum backup capacity associated with the physical layer implementation of the logical network routing solution is examined to determine if the solution is reasonable or appropriate. The process looks at each failure scenario to identify the maximum necessary bandwidth required for each link to accommodate the failures. Multiple failures will require additional link capacity for protection. Referring to box 240B, step 240 provides primary and protection wavelength assignments for each link for both GB and WS traffic flows (i.e., the links are now provisionable). The specific processing steps associated with step 240 will be discussed in more detail below with respect to FIG. 5. Step 240 may fail when, per step 245, key links are too heavily loaded such that alternate path weights or popularities, different path sets and/or different path ordering is appropriate. Thus, if step 240 fails then the method 200 returns to step 230.

At step 250, an unprotected best effort (BE) traffic grooming and routing process is performed. Generally speaking, a logical topology for grooming BE traffic flows is developed to provide many point to point demands which accommodate opportunistic insertion of BE traffic into links that are not fully utilized by other traffic flows. The routing solution comprises solving a minimum cost, multi-commodity flow problem that enables load balancing between links in that the maximum capacity on any one link or fiber is minimized. Referring to box 250B, step 250 provides assigned wavelengths for best effort traffic and final fiber provisioning. A specific processing steps associated with step 250 will be discussed in more detail below with respect to FIG. 6. Step 250 may fail when, per box 255, fiber capacity is exceeded or undesirable for some reason, such that a different path ordering is appropriate. Thus, if step 250 fails then the method 200 returns to step 240.

In one embodiment of the invention, an optional step 260 is invoked after the completion of step 250, where the assigned wavelengths required for the unprotected (BE) and protected (GB and WS) traffic are pooled and a backup capacity sharing calculation performed again as in Step 240 to determine the final capacity requirements to determine if the available physical layer network capacity supports the load.

In one embodiment, step 240 includes only protected traffic to determine capacity requirements for those WCs when massive capacity sharing takes place among them and can be viewed as a preliminary step to wavelength requirements for BE traffic of step 250. In one embodiment, the resulting 0-protected BE wavelengths are combined with the protected wavelengths and the sharing calculation repeated on an overall sharing pool that includes the possibly larger pool of wavelengths from the 0-protected BE wavelengths. The resulting sharing calculation provides the final determination of the required capacity on each link.

Optional step 260 may fail when, per step 245, key links are too heavily loaded such that alternate path weights, different path sets and/or different path ordering is appropriate. Thus, if optional step 260 fails then the method 200 returns to step 230. Optional step 260 may also fail when, per box 255, fiber capacity is exceeded or undesirable for some reason, such that a different path ordering is appropriate. Thus, if step 250 fails then the method 200 returns to step 240 and/or 230.

The above-described processing steps 200 of FIG. 2 depict a high level view of a methodology according to an embodiment of the present invention. Various processing steps, sub-processing steps and so on will now be described. Generally speaking, each variation of each step and/or sub-step may be combined with any variation of any other step and/or sub-step such that multiple embodiments of the methodology of the present invention are provided. Each of these embodiments is contemplated by the inventors.

In one embodiment of the invention, step 250 is performed prior to step 240 since Step four provides a set of wavelengths corresponding to unprotected traffic that represents a potentially significant pool of wavelengths available for capacity sharing. In any part of a best effort flow that is compromised or fails, whether or not the flow is split, the entire best effort flow is lost and all of its wavelengths are then available for protection sharing, such as described above with respect to optional step 260.

Figure 3:
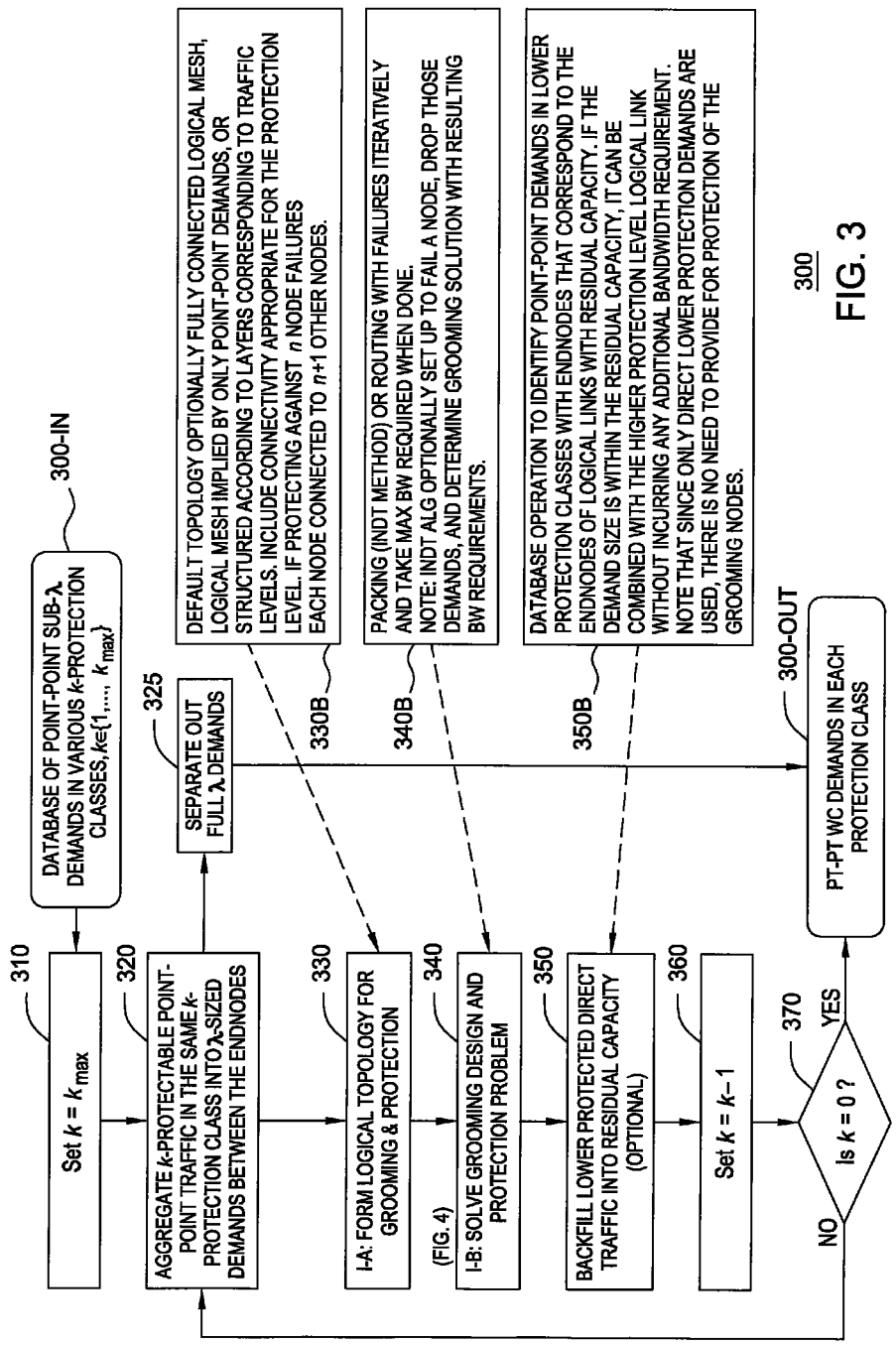
FIG. 3 depicts a flow diagram of a method for guaranteed bandwidth protection-class traffic aggregation and grooming.

FIG. 3 depicts a flow diagram of a method for a guaranteed bandwidth protection-class traffic aggregation and grooming. Specifically, the method 300 of FIG. 3 is suitable for use in implementing the guaranteed bandwidth protection-class traffic aggregation and grooming process described above with respect to step 220 of the method 200 of FIG. 2.

Referring to box 300-IN, the method 300 uses/receives a database of point-to-point sub wavelength demands in various k protection classes is utilized, where k is a member of a set ranging from 1 to $k_{MAX}$.

The method 300 of FIG. 3 is entered at step 310, where a protection class indicative variable k is set equal to $k_{MAX}$. Referring to box 310B, At step 320, the method aggregates k-protectable point-to-point traffic flows in the same k-protection class into wavelength-sized demands between the relevant endnodes.

The method 300 then follows two parallel tracks. In a first track, at step 325 the method separates out full wavelength demands and then provides those as outputs. The partially filled wavelengths continued to be processed next.

In a second track, at step 330 the method forms for the present protection class k a logical topology for grooming and protection. Referring to box 330B, the default topology optionally comprises any of a fully connected logical mesh, a logical mesh implied only by point-to-point demands and/or a topology structured according to layers corresponding to traffic levels. Connectivity appropriate for the protection levels is included in the default topology. If protecting against n node failures, then each node is preferably connected to n+1 other nodes.

At step 340, a grooming designed and protection problem is solved for the present protection class k. Referring to box 340B, a packing (such as INDT) method or routing with failures is iteratively performed to arrive at a solution providing maximum required bandwidth on each link. In one embodiment, the INDT grooming algorithm is optionally set up to fail a node and drop the demands associated with that node to determine a grooming solution with resulting bandwidth requirements.

At optional step 350, lower protected direct traffic is backed filled into a residual capacity for the present protection class k. Referring to box 350B, a database operation identifies point-to-point demands in lower protection classes with endnodes that correspond to the endnodes of logical links with residual capacity. If the demand size is within the residual capacity, then the demand is combined with a higher protection level logical link without incurring any additional bandwidth requirement. Otherwise residual capacity is used to satisfy the bandwidth requirement of the demand size. It is noted that since only direct a lower protection demands are used, there is no need to provide for protection of the grooming nodes.

At step 360, the presently processed protection class-indicative variable k is decremented (i.e., k=k−1), and at step 370 a determination is made as to whether the presently processed protection class-indicative variable k is now equal to zero. Additional protection classes are to be processed (i.e., k>0), and the method proceeds to step 320. Otherwise the method exits. Referring again to box 300-OUT, the method 300 provides/updates a database of point-to-point wavelength circuit demands in each protection class.

Referring to box 300-OUT, the method 300 provides/updates a database of point-to-point wavelength circuit demands in each protection class.

Figure 4:
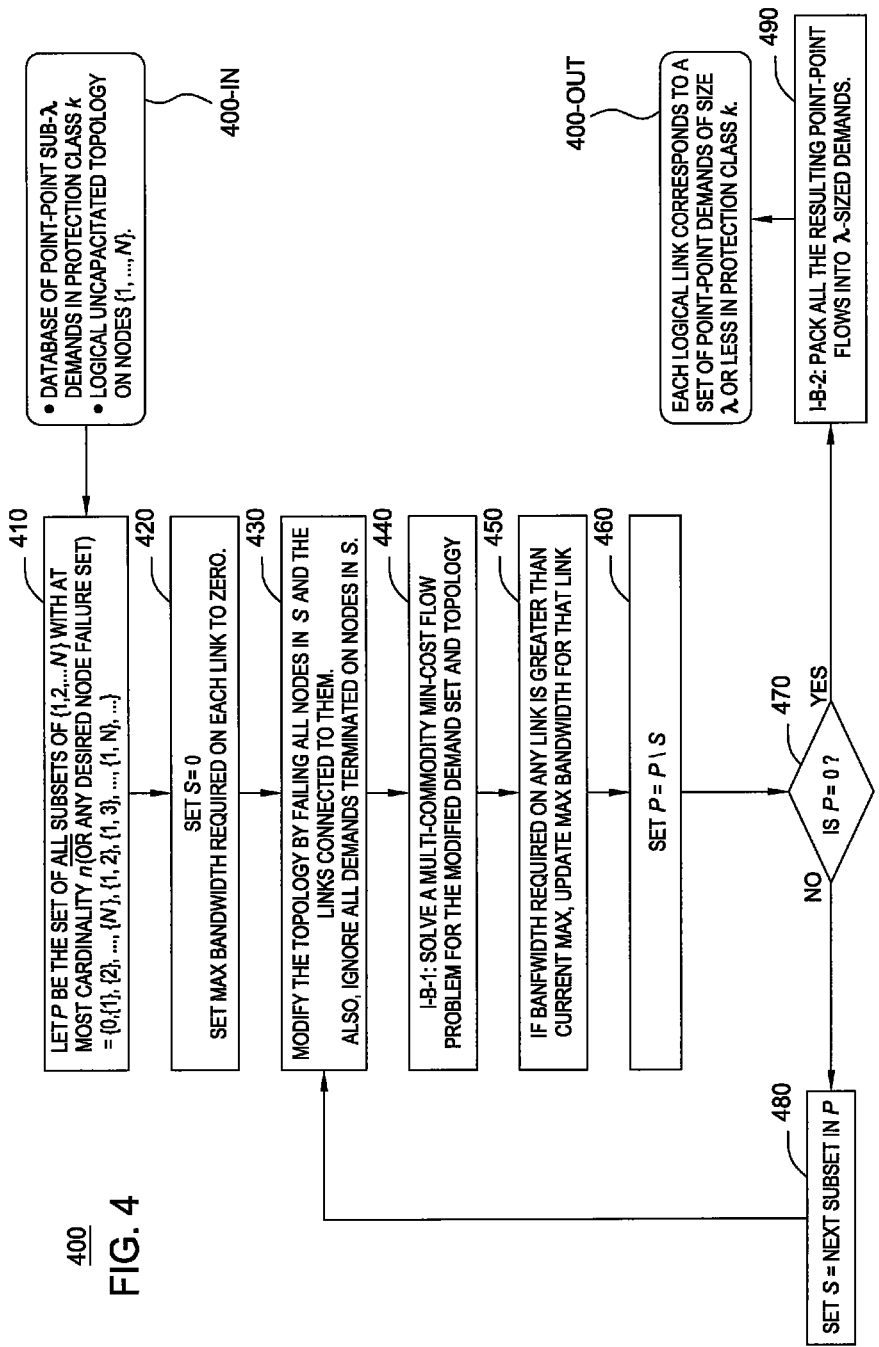
FIG. 4 depicts a flow diagram of a method for solving a grooming design and protection problem.

FIG. 4 depicts a flow diagram of a method for solving a grooming design and protection problem. The method 400 of FIG. 4 is suitable for implementing, for example, step 340 of the method 300 discussed above with respect to FIG. 3.

Referring to box 400-IN, the method 400 uses/receives a database of point-to-point sub wavelength demands in various protection classes k (where k is a member of a set ranging from 1 to $k_{MAX}$) and a logical uncapacitated topology on nodes $\{1, \ldots, N\}$.

At step 410, a variable P representing a node failure set is equated to a set of all subsets of $\{1, \ldots, N\}$ with a most a cardinality of n. Other a desired (maximum) node failure sets may be selected. In this example, P=$\{0, \{1\}, \{2\}, \ldots, \{N\}, \{1,2\}, \{1,3\}, \ldots \{1,N\}, \ldots \}$.

At step 420, a maximum bandwidth variable is set equal to zero for each link. And further, a variable S representing one of the node failure subsets of P is initially set to the empty set.

At step 430, the topology is a modified by failing all nodes in S and the links connected to them. All demands terminated on the nodes in S are ignored.

At step 440, a multiple commodity, minimum cost flow problem for the modified demand set and topology is solved. The logical link capacities can be set to the number of optical channels per fiber, for example. A minimum cost multi-commodity flow problem can be solved with a commercial IP solver. Alternatively, in one embodiment, a solution to the multi-commodity minimum-cost flow problem for the modified demand set and topology is solved using the INDT grooming algorithm discussed in the paper "Overview of INDT-a new tool for next-generation network design," B. Doshi, et al., IEEE Global Telecommunications Conference 1995—GLOBECOM '95, vol. 3, p. 1944, section 2.2.5.

Briefly, within the context of the INDT methodology, a first step is to form direct links in units of the wavelength data rate between a given node pair for all the traffic between that pair. For all full wavelengths, those direct links are retained. For the remaining underutilized links with residual capacity, all those links form the "straggler" network, a subset of which links are used to pack the balance of links into as described in the following optimization methodology which applies only to the straggler network.

Let T be the total spare capacity in the initial straggler network and let C be the capacity or wavelength data rate of each link. Let $d_i$, i=1, 2, ..., M be the traffic carried on links of the initial straggler network. Then the links carrying $d_i$, i=1, 2, ..., K can be removed and their traffic rerouted only if:

$$\Sigma_{i=1,\ldots,k} d_j \leq T-KC$$

Starting from the initial straggler network, the INDT method finds the maximum value of K for which the above inequality holds (say $K_{max}$). Therefore, $K_{max}$ is the maximum number of removable links and yields a lower bound on the backbone capacity needed to carry all traffic demand and indirectly yields the lower bound on cost of the network.

In addition, the equation provides a useful indication in the method for optimization. The total spare capacity in the network T is a constant. For every link i that is removed ($d_i$ rerouted), C units are subtracted on the RHS. Therefore $K_{max}$ is obtained when links are removed in ascending order of utilization (smallest d, first). Let dmax represent the traffic on the last removable link (the $[K_{max}]^{th}$ link). The inequality suggests that the most number of links are removed by getting rid of links that carry traffic demands of $d_{max}$ or less and rerouting their traffic on to the links that carry traffic greater than $d_{max}$. This is the approach used in various embodiments of the network optimization discussed herein.

After the initial network design, the method sorts the straggler links in ascending order of utilization $\{d_i\}$. Into the equation the method substitutes $d_i$ in the ascending order and finds $K_{max}$ for which the inequality holds. Let $d_{max}$ represent the traffic carried on the last link removable ($K_{max}$). The method then divides the sorted straggler list into two parts. The first part contains links carrying demands less than $d_{max}$. The second part contains the remaining links (carried traffic>$d_{max}$). The intent is to reroute traffic from the first list onto paths consisting of links from the second list. The method further realizes that for links of a given utilization, the greatest payoff is obtained by removing the longest links first. The method further sorts the first list so that links of a given utilization are arranged in ascending order of mileage.

It should be noted that the number of links removable is based solely on capacity considerations and not on actual availability of spare capacities on candidate alternate paths. The method next picks, in sequence, links from the first list and reroutes them onto paths consisting of links in the second list. This stage of optimization can be performed iteratively wherein the method tries to reroute on to the shortest path first and then the next shortest path and so on. In one embodiment, two iterations are performed. More or fewer iterations may be performed in various embodiments.

At step 450, if the bandwidth required on any link is greater than the current maximum bandwidth than the maximum bandwidth associated with that link is updated.

At step 460, the set S of the particular node failure subset just processed is removed from P of node failure subsets.

At step 470, a query is made as to whether a set P is now equal to the empty set (i.e., are there any more failure subsets to process). If the set P is not empty, then the method proceeds to step 480 where the set S is equated to the next subset in P, and steps 430-470 are repeated for the next subset in P. Otherwise at step 490 all of the resulting point-to-point flows are packed into wavelength-sized demands. This is accomplished via, for example, an integer roundup and/or other packing algorithm may be used to pack the various IP flows into wavelength-size demands.

Referring to box 400-OUT, the method 400 provides/updates a database to indicate that for the current protection class k each logical link corresponds to a set of point-to-point demands of wavelength size or less.

Figure 5:
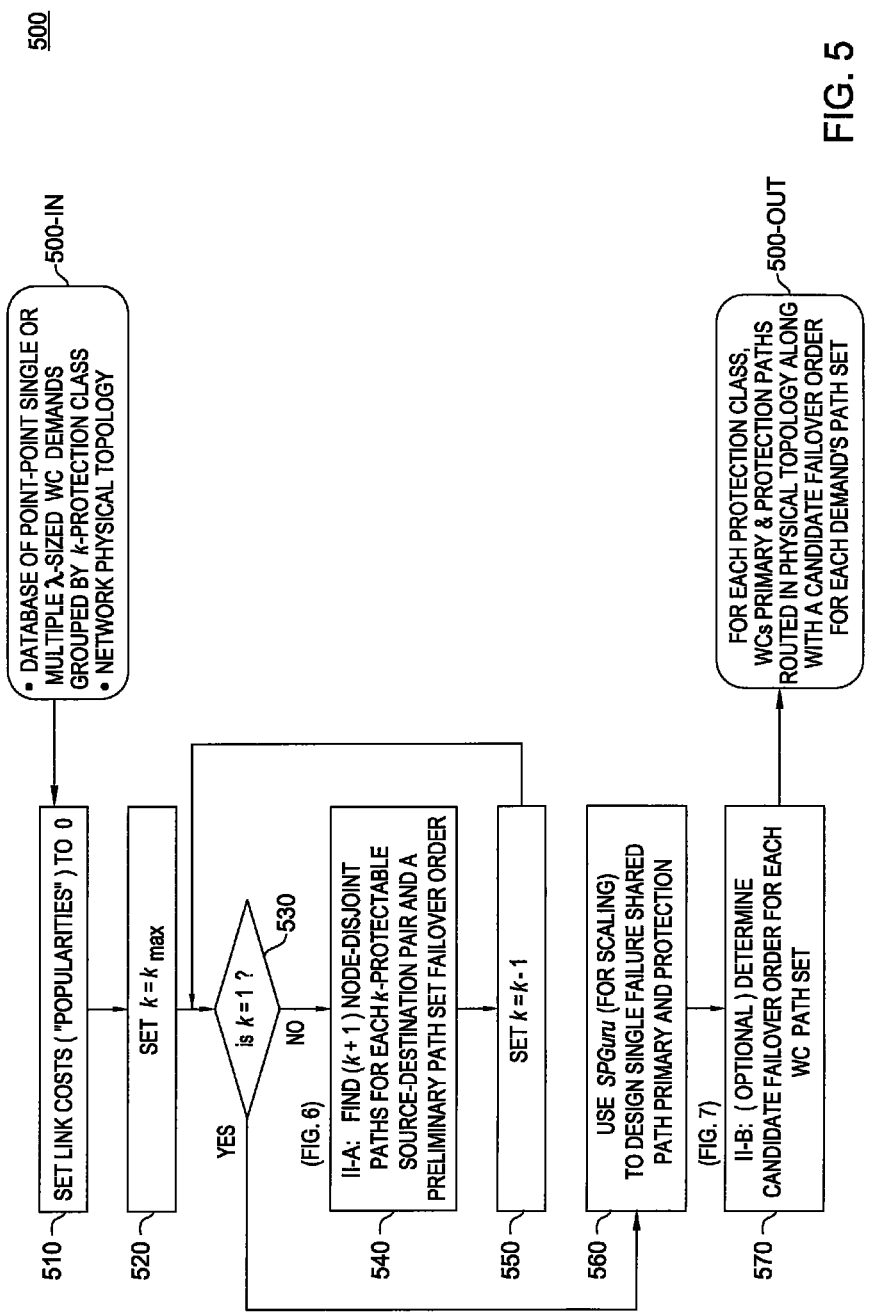
FIG. 5 depicts a flow diagram of a method for guaranteed bandwidth and multi-wavelength service routing and protection.

FIG. 5 depicts a flow diagram of a method for guaranteed bandwidth and multi-wavelength service routing and protection. The method 500 of FIG. 5 is suitable for implementing, for example, step 230 in the method 200 of FIG. 2.

Referring to box 500-IN, the method 500 uses/receives a database of point-to-point single or multiple wavelength-sized WC demands grouped by k-protection class and information pertaining to network physical topology.

At step 510, link costs (i.e., "popularities") are set equal to zero. The inventors note that link costs may optionally be set to small positive constants to avoid subsequent anomalies in some optimization processes.

At step 520, a protection class indicative variable k is set equal to $k_{MAX}$.

At step 530, a determination is made as to whether k−1. If k equals one, then the method proceeds to step 540 for processing of the single protection class. Otherwise the method proceeds to step 560.

At step 540, the method finds (k+1) node-disjoint paths for each k-protectable source-destination pair and establishes a preliminary path set failover order. An optional action at step 540 is the imposition of co-propagation of all wavelengths of a multi-wavelength WS. At step 550 k is decremented, and the method proceeds back to step 530. This process will be discussed in more detail below with respect to FIG. 6.

At step 560, single failure shared path primary and protection design is provided. Such design may be accomplished by, for example, a commercial network design tool capable of determining shared mesh protection such as the known SPGuru tool manufactured by OPnet Technologies of Maryland. The inventors notes that commercial solvers such as SPGuru or INDT provide a reasonably capacity-efficient node-disjoint primary and protection path plan for single-protected traffic since this is current practice and the problem and methods are well established. Link costs resulting from the k>1 processes may be used in calculating the primary and protection path plan.

At optional step 570, the method determines candidate failover order for each the WC path set. This optional process will be discussed in more detail below with respect to FIG. 7.

Referring to box 500-OUT, the method 500 provides/updates a database to indicate for each protection class the wavelength circuits primary and protection paths routed in the physical topology along with a candidate failover order for each demand's path set.

Figure 6:
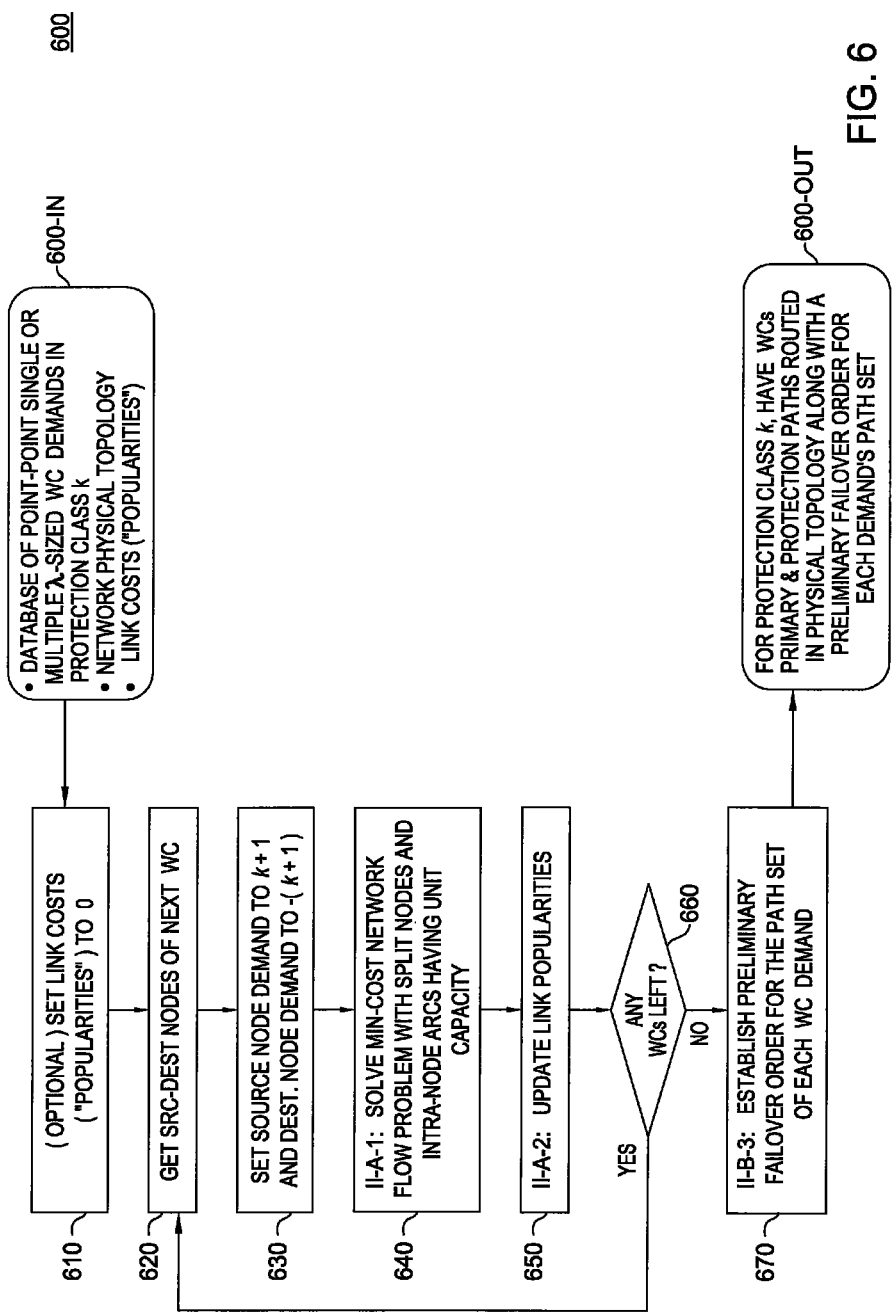
FIG. 6 depicts a flow diagram of a method for finding (k+1) node-disjoint paths for each k-protected demand.

FIG. 6 depicts a flow diagram of a method for finding (k+1) node-disjoint paths for each k-protected demand. The method 600 of FIG. 6 is suitable for implementing, illustratively, step 540 as discussed above with respect to the method 500 of FIG. 5.

Referring to box 600-IN, the method 600 uses/receives a database of point-to-point single or multiple wavelength-sized WC demands in protection class k, information pertaining to network physical topology and link cost or "popularities" information.

At optional step 610, link costs are set equal to zero.

At step 620, the source and destination nodes of a next wavelength circuits are retrieved.

At step 630, the source node demand is set to k+1 and the destination node demand is set to −(k+1).

At step 640, the method solves a minimum-cost network flow problem with split nodes and intra-node arcs having a unit capacity. This may be solved using CPLEX, Suurballe's algorithm for k node-disjoint paths, or another algorithm.

At step 650, the link popularities are updated. In one embodiment, updates based on paths just generated are not updated. Specifically, in one embodiment of the invention the batch of demands for a particular protection level are generated first and then post-processed to determine the link popularities.

In another embodiment, a method determines wavelength requirements on each link due to a demand's path set, and adds this to the cost for each link. Alternatively, every time a set of k paths is generated, the resulting links used are added to the link popularities, i.e., each link popularity or cost in increased a fixed amount c each time that link is used in a path set. That way the more times it is used, the more costly it becomes. Hence, it will be more likely to be avoided in the next set of k paths. In another embodiment, some links are set as having a very high popularity (i.e., cost) because of known or likely congestion problems.

At step 660, a query is made as to whether any wavelength circuits are left to be processed. If any are left, then the method 600 repeat steps 620-660. Otherwise, the method 600 proceeds to step 670.

At step 670, the preliminary failover order for the path set of each wavelength circuit demand is established. In one embodiment, a default order is used (such as an order determined using step 640). Alternatively, if there are multiple demands between particular endnodes, each demand has its paths ordered in a cyclical fashion. That is, for paths (0, . . . , k), demand 1 has path 0 as primary, path 1 as secondary, . . . , path k as last backup; demand 2 has path 1 as primary, path 2 as secondary, . . . , path k as next-to-last backup; and so on in a cyclical manner.

Referring to box 600-OUT, the method 600 provides/updates a database wherein for each protection class k processed, the wavelength circuits have a candidate failover order for each demand's path set.

Figure 7:
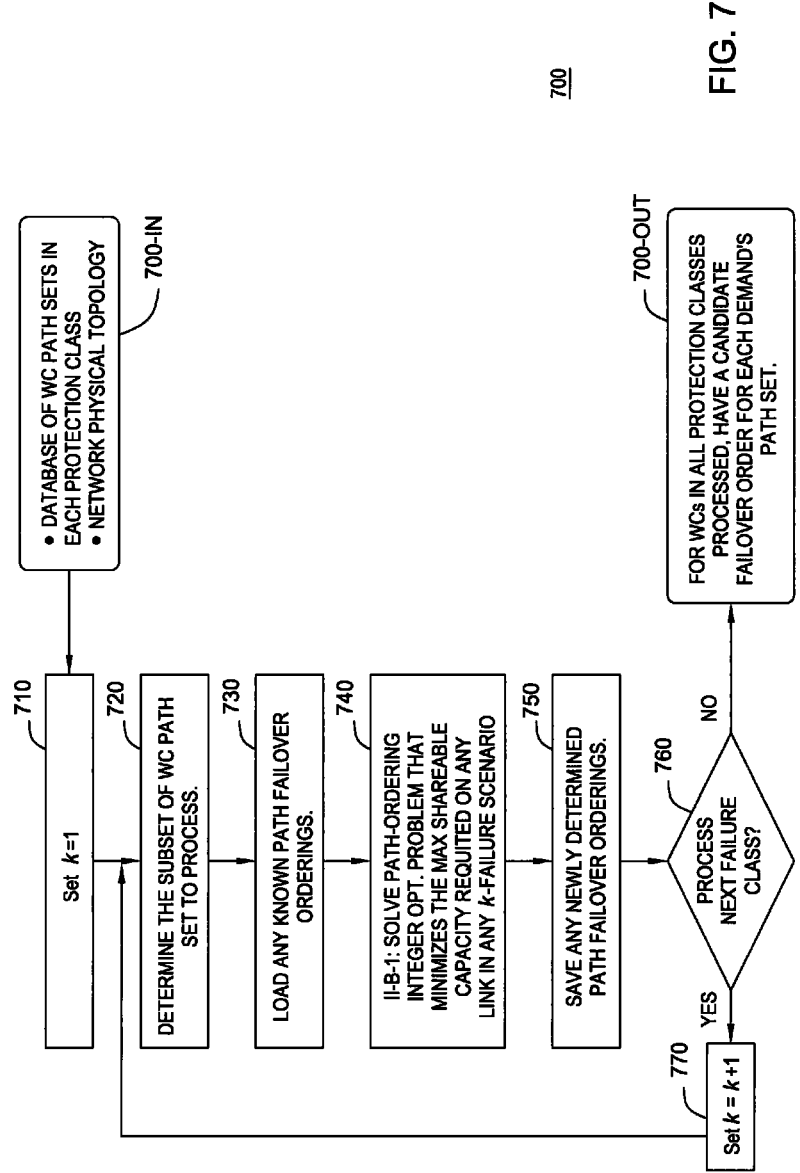
FIG. 7 depicts a flow diagram of a method for determining candidate failover order for each WC path set.

FIG. 7 depicts a flow diagram of a method for determining candidate failover order for each WC path set. The method 700 FIG. 7 is suitable for use in, illustratively, optional step 570 of the method 500 of FIG. 5.

Referring to box 700-IN, the method 700 uses/receives a database of WC path sets in each protection class and information pertaining to network physical topology.

At step 710, the protection class indicator variable k is the set equal to 1.

At step 720, the subset of WC path sets to process is determined. For example, the subset includes in various embodiments all WC path sets up for classes k>1 and/or the WC path sets for classes k=1.

At step 730, any known path failover orderings are loaded.

At step 740, the method solves a path ordering integer optimization problem that minimizes the maximum shareable capacity required on any link in any k-failure scenario. Since the paths are already known, these optimization problems tend to be readily solved.

At step 750, any newly determined path failover orderings are saved.

At step 760, a determination is made as to whether a next failure class should be processed. If a next failure class remains to be processed, then at step 770 the variable k is incremented and steps 720-760 are repeated.

Referring to box 700-OUT, the method 700 provides/updates a database wherein for all of the wavelength circuits in all protection classes processed now have a candidate failover order for each demand's path set.

Figure 8:
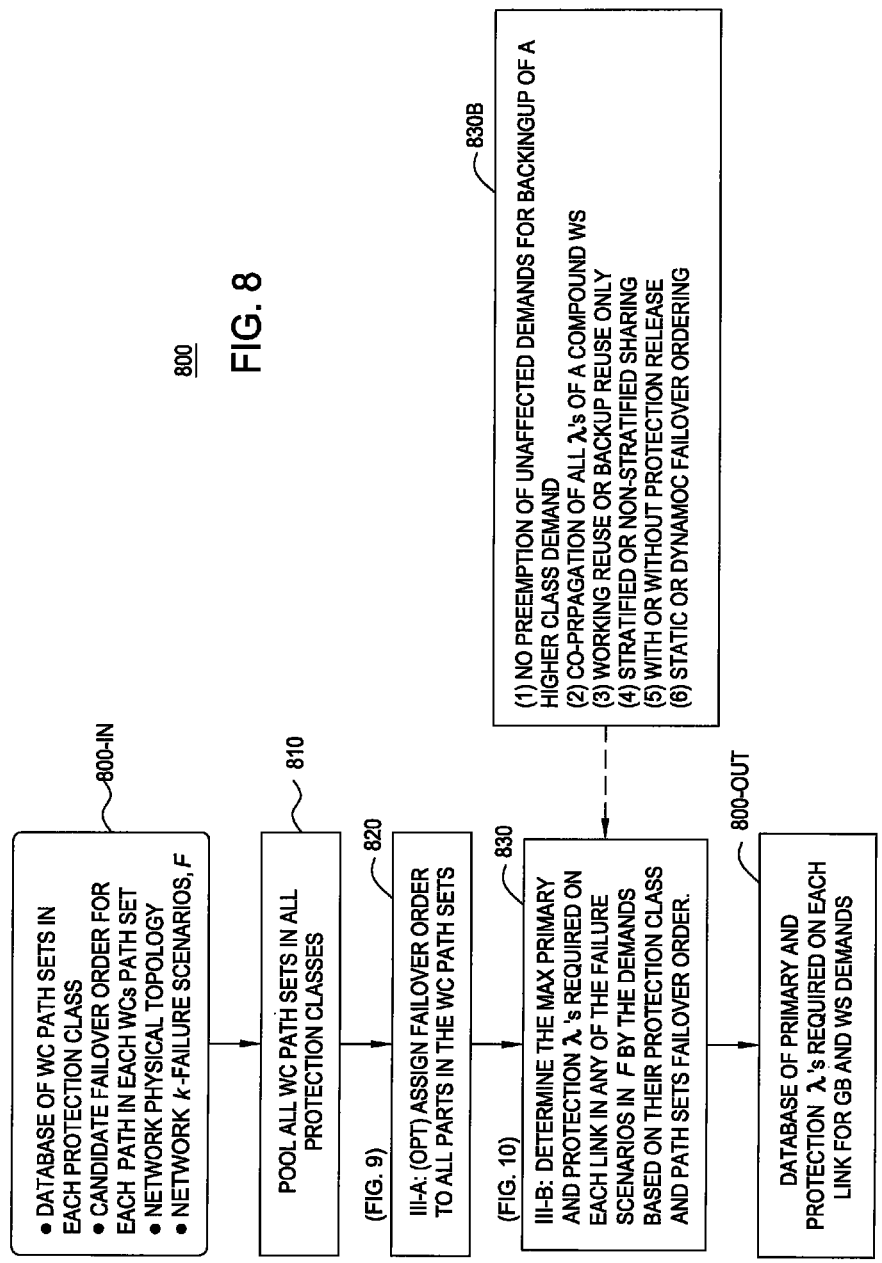
FIG. 8 depicts a flow diagram of a method for determining guaranteed bandwidth (GB) and wavelength service (WS) backup capacity sharing.

FIG. 8 depicts a flow diagram of a method for determining guaranteed bandwidth (GB) and wavelength service (WS) backup capacity sharing. The method 800 of FIG. 8 is suitable for use in, illustratively, step 240 of the method 200 of FIG. 2.

Referring to box 800-IN, the method 800 uses/receives a database of WC path sets in each protection class, candidate failover order for each path in each WC path set, information pertaining to the network physical topology and information pertaining to a list of network k-failure scenarios F of interest.

At step 810, all WC path sets in all protection classes are pooled.

At optional step 820, a failover order is assigned to all paths in the WC path sets. This may be implemented using an ordering heuristic. Alternatively, default or candidate ordering such as provided within step 230 of the method 200 of FIG. 2 may be used to assign failover order.

At step 830, the method 800 determines the maximum number of primary and protection wavelengths required on each link in any of the k-failure scenarios in F using the demands based on their protection class and path set's failover order. Referring to box 830B, the step may be implemented by one or more of the following: (1) no preemption of unaffected demands for backup of higher class demand; (2) co-propagation of all wavelengths of a compound WS; (3) working reuse or backup reuse only; (4) stratified or non-stratified sharing; (5) with or without protection release; and/or (6) static or dynamic failover ordering.

Referring to box 800-OUT, the method 800 provides/updates a database of primary and protection wavelengths required on each link for GB and WS demands.

Figure 9:
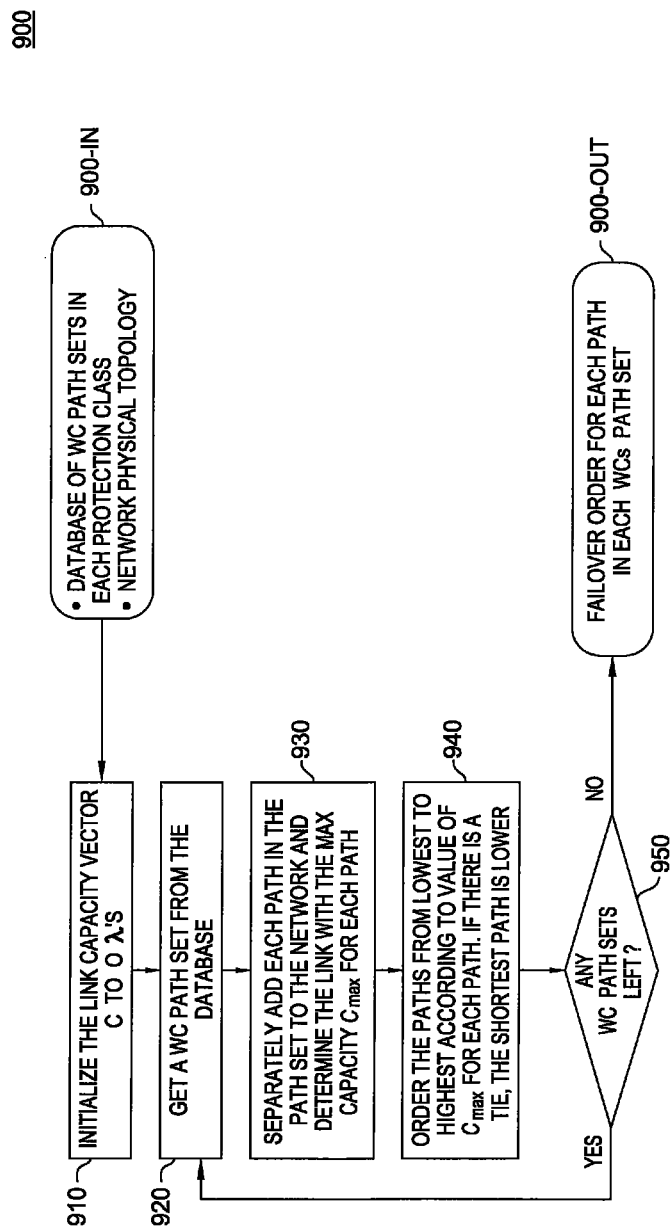
FIG. 9 depicts a flow diagram of a method for determining failover order assignment to paths in WC path sets according to one embodiment of the invention.

FIG. 9 depicts a flow diagram of a method for determining failover order assignment to paths in WC path sets according to one embodiment of the invention. The method 900 of FIG. 9 is suitable for use in, illustratively, step 820 of the method 800 of FIG. 8.

Referring to box 900-IN, the method 900 uses/receives a database of WC path sets in each protection class and information pertaining to the network physical topology.

At step 910, the method initializes a link capacity vector C to zero wavelengths.

At step 920, a first or next WC path said is retrieved from the database. When implementing and ordering heuristic such as for step 820 of FIG. 8, the heuristic will depend on the order in which the WCs are selected from the database. The WC's may be selected in terms of priority, first come first serve and so on.

At step 930, the method separately adds each path in the path set to the network and determines the link with a maximum capacity $C_{MAX}$ for each path. At step 940, the method orders the paths from lowest to highest according to the value of $C_{MAX}$ associated with each path. Optionally, in the case of the maximum capacity of two paths being the same, the shorter path (i.e., fewest number of hops) is deemed to be lower for ordering purposes.

At step 950, a determination is made as to whether any WC path sets are left to be processed. If there are remaining WC path sets, then steps 920-950 are repeated for each of the remaining the beastie path sets. Otherwise the method 900 exits.

Referring to box 900-OUT, the method 900 produces a failover order for each path in each WC path set.

The method operates to pool all WC primary and protection paths for GB and WS traffic and assign a failover order. The method then finds the maximum number of simultaneous wavelengths required for each link. The rules used include, in one embodiment: no preemption, Protection Release, Primary Reuse, Co-prop of all wavelengths of a compound WS.

In one embodiment of the invention, steps 930-950 implement a heuristic that for each demand incrementally adds each path and chooses as "primary" the path that results in the least marginal addition of incremental required capacity to the network. This is dependent on the order in which the demands are added. The resulting proposed design is then evaluated for capacity requirements. In one embodiment, this is achieved by iterating over all possible single, double, and triple failure scenarios and determining what wavelength circuits are unaffected and which are hit, in which case they are switched to their backup paths (if any), thus giving the maximum simultaneous wavelengths required on each link. This allows for efficiencies such as primary capacity reuse of failed demands, while enforcing rules such as no preemption of unaffected demands, including their backup, as long as the protection level is not exceeded. Simultaneous consideration of all the failure cases together results in substantial reduction in the amount of required protection capacity. Additionally, backup capacity can be further reduced by releasing the backup capacity reserved by a k-protected demand in a given failure scenario where the demand is not affected but k failures have occurred in the network.

Figure 10:
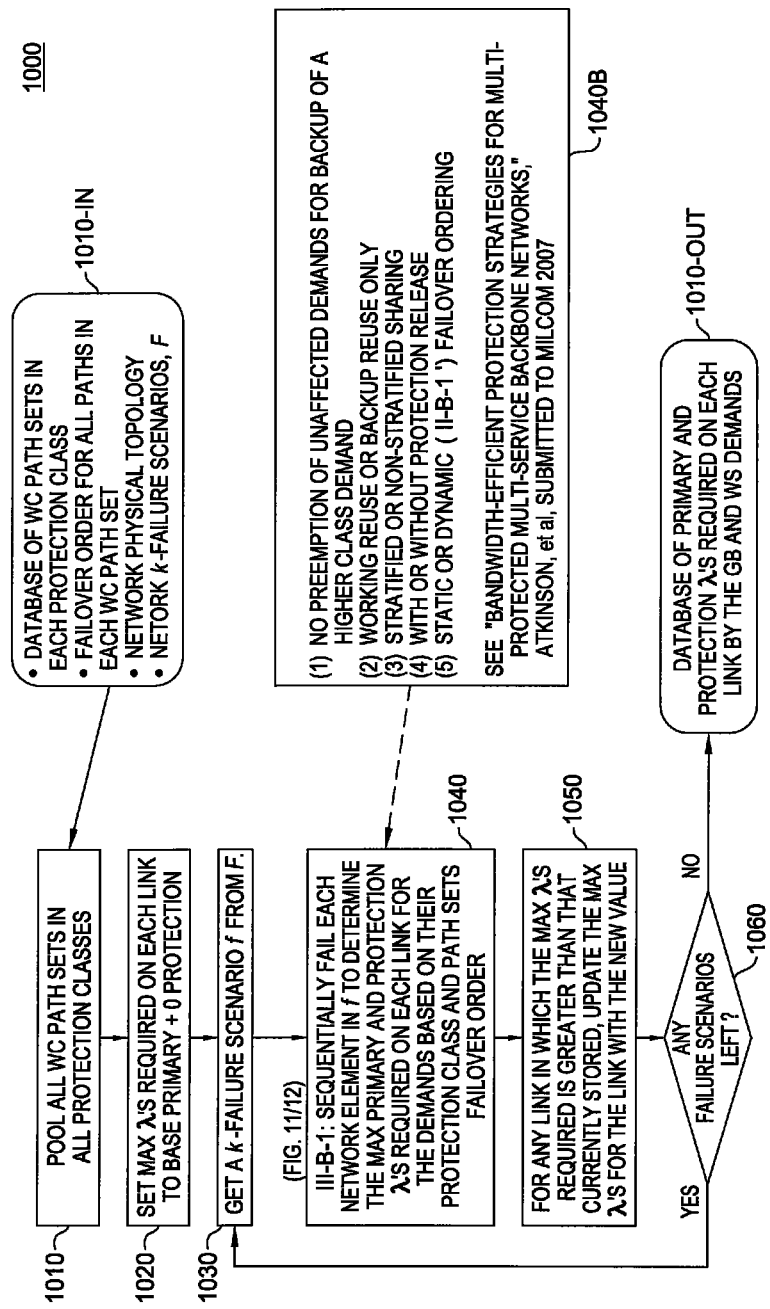
FIG. 10 depicts a flow diagram of a method for determining maximum primary and protection wavelengths required by all wavelength circuits in a k-failure scenario.

FIG. 10 depicts a flow diagram of a method for determining maximum primary and protection wavelengths required by all wavelength circuits in a k-failure scenario. The method 1000 of FIG. 10 is suitable for use in, illustratively, step 830 of the method 800 of FIG. 8.

Referring to box 1000-IN, the method 1000 uses/receives a database of WC path sets in each protection class, a failover order for all paths in each WC path set, information pertaining to the network physical topology, and information pertaining to the list of network k-failure scenarios of interest, F.

At step 1010, all WC path sets in all protection classes are pooled.

At step 1020, the method sets the maximum wavelengths required on each link to provide primary capacity plus zero protection. That is, the method determines the number of wavelengths necessary to satisfy primary wavelength requirements where no failure state exists.

At step 1030, a first or next k-failure scenario f is retrieved from a list of k-failure scenarios of interest, F.

At step 1040, the method sequentially fails each network element in f to determine the maximum number of primary and protection wavelengths required on each link for the demands based on their protection class and path sets failover order. Referring to box 1040B, the step may be implemented by one or more of the following: (1) no preemption of unaffected demands for backup of a higher class demand; (2) working reuse or backup reuse only; (3) stratified or non-stratified sharing; (4) with or without protection release; and/or (5) static or dynamic failover ordering.

At step 1050, for any link in which the required maximum number of wavelengths is greater than the respective currently stored maximum number of wavelengths, the method updates the maximum number of wavelengths associated with the link with the new value.

At step 1060 a determination is made as to whether any k-failure scenarios from the list of k-failure scenarios of interest (F) has yet to be processed. If any scenarios are left, steps 1030-1060 are repeated for the remaining scenarios. Otherwise the method 1000 exits.

Referring to box 1000-OUT, the method 1000 produces/updates a database of primary and protection wavelengths required one each link by the guaranteed bandwidth and wavelength service demands.

Figure 11:
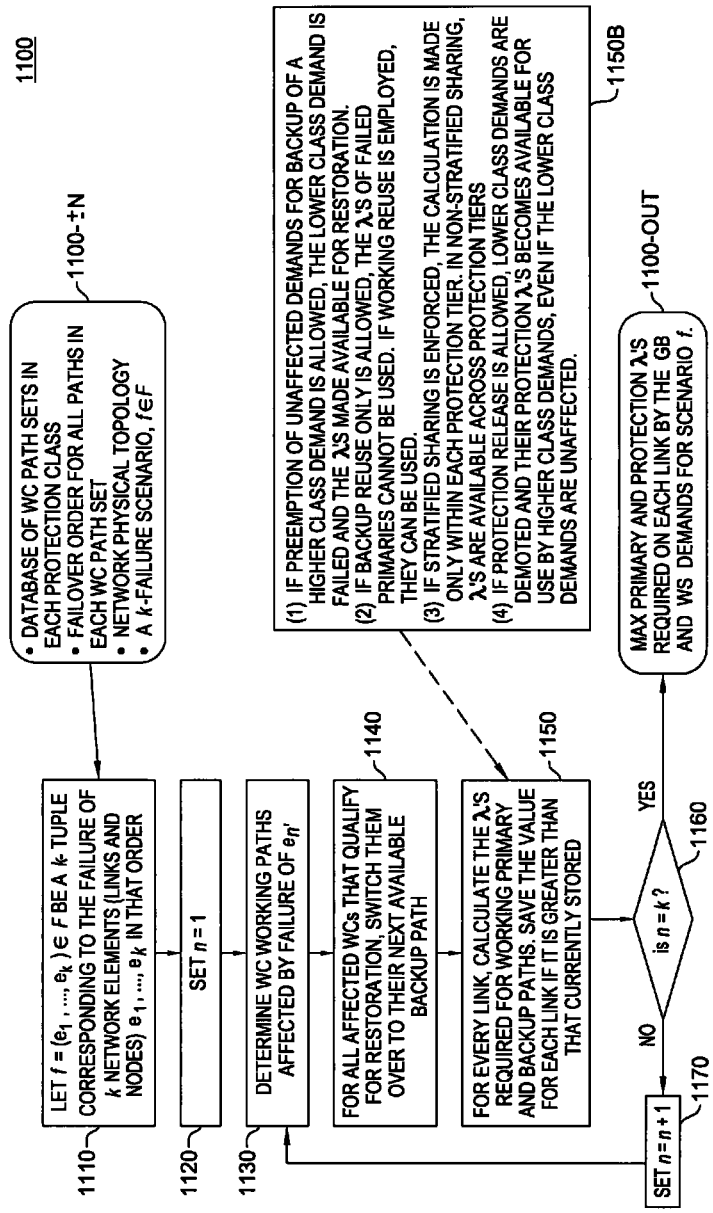
FIG. 11 depicts a flow diagram of a method for determining a maximum number of wavelengths required on each link by all wavelength circuits in a k-failure scenario (Static Failover Situation)

FIG. 11 depicts a flow diagram of a method for determining a maximum number of wavelengths required on each link by all wavelength circuits in a k-failure scenario (Static Failover Situation). The method 1100 of FIG. of 11 is suitable for use in common illustratively, step 1040 of the method 1000 of FIG. 10.

Referring to box 1100-IN, the method 1100 uses/receives a database of WC path sets in each protection class, a failover order for all paths in each WC path set, information pertaining to the network physical topology, and information pertaining to a particular network k-failure scenario f (where f is one of the network k-failure scenarios of interest F).

At step 1110, the method establishes a relationship of $f=(e_1, \ldots, e_k) \in F$ as a k-tuple corresponding to the failure of k network elements (links and nodes) $e_1, \ldots, e_k$ in that order, and at step 1120 a variable n is set equal to one (i.e., n=1).

At step 1130, the method determines the wavelength circuit working paths affected by a failure of $e_n$.

At step 1140, all affected wavelength circuits that qualify for restoration are switched over to their next available backup path. It is noted that since the relevant backup paths might have been effected by a previous failure (i.e., failed or appropriated by a higher priority to be safe), the backup paths are checked in failover order to determine which backup path is the first available backup path.

At step 1150, for every link the method calculates the wavelengths required for working primary and backup paths. This value is saved for each link if it is greater than a corresponding value currently stored in the database.

Referring to box 1150B, a sharing policy is applied. The sharing policy is applied as one or more of: (1) if preemption of unaffected demands for backup of a higher class demand is allowed, the lower class demand is failed in the wavelengths made available for restoration; (2) if backup reuse only is allowed then the wavelengths of failed primaries cannot be used, whereas if working reuse is employed then the wavelengths of failed primaries can be used; (3) if stratified sharing is enforced then the calculation is made only within each protection tier, whereas if non-stratified sharing is used, wavelengths are made available across protection tiers; and/or (4) if protection release is allowed, lower-class demands are demoted and their protection wavelengths become available for use by higher class demands, even if the lower class demands are unaffected.

At step 1160 a determination is made as to whether any wavelength circuit working paths affected by a failure of $e_n$ have yet to be processed (i.e., is n=k?). If additional WC working paths affected by a failure of $e_n$ have yet to be processed, then the variable n is incremented at step 1170 and steps 1130-1160 are repeated for each affected additional WC working path. Otherwise the method 1100 exits.

Referring to box 1100-OUT, the method 1100 produces/updates a database indicative of the maximum primary and protection wavelengths required on each link by the DB and WS demands for the particular k-failure scenario f.

Figure 12:
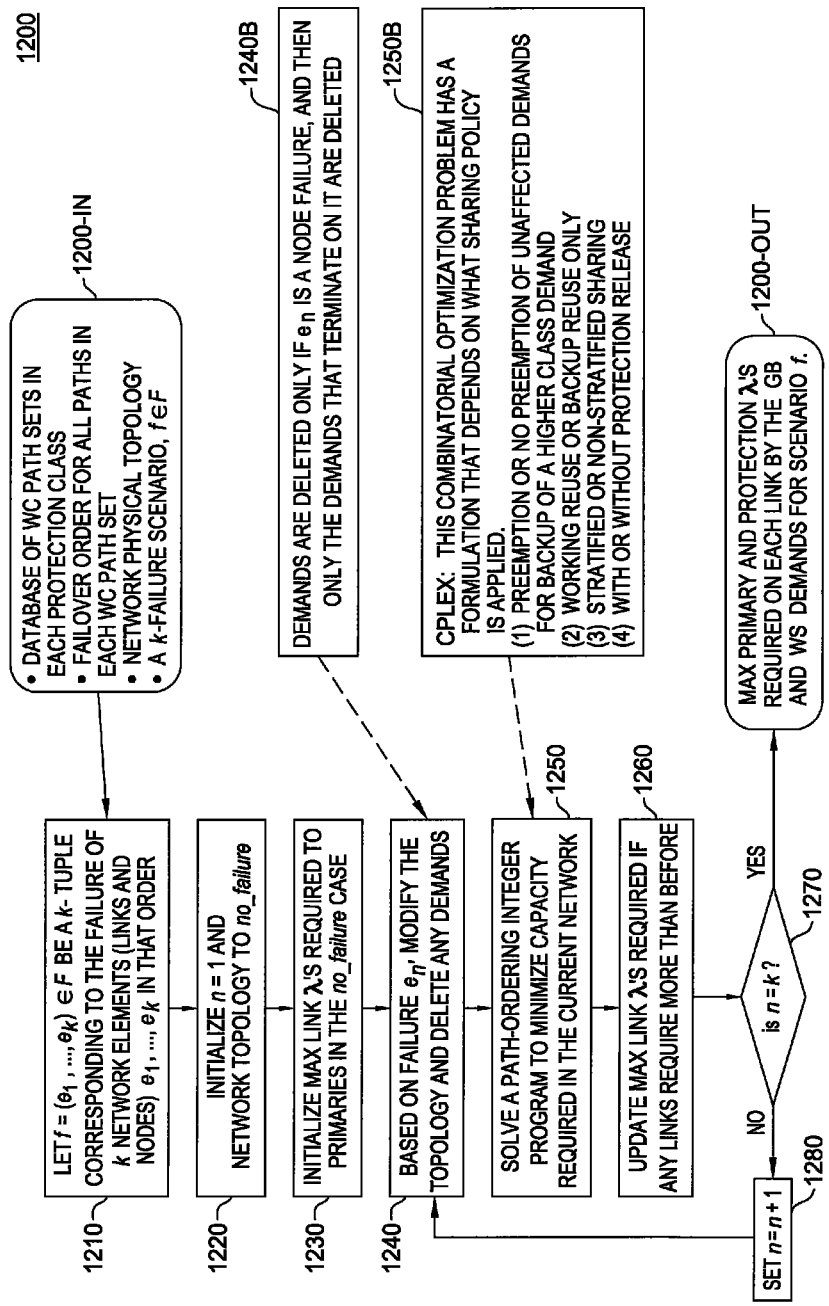
FIG. 12 depicts a flow diagram of a method for determining a maximum number of wavelengths required on each link by all wavelength circuits in a k-failure scenario (Dynamic Failover Situation)

FIG. 12 depicts a flow diagram of a method for determining a maximum number of wavelengths required on each link by all wavelength circuits in a k-failure scenario (Dynamic Failover Situation). The method 1200 of FIG. 12 is suitable for use in, illustratively, step 1040 of the method 1000 of FIG. 10.

Referring to box 1200-IN, the method 1200 uses/receives a database of WC path sets in each protection class, a failover order for all paths in each WC path set, information pertaining to the network physical topology, and information pertaining to a particular network k-failure scenario f (where f is one of the network k-failure scenarios of interest F).

At step 1210, the method establishes a relationship of $f=(e_1, \ldots, e_k) \in F$ as a k-tuple corresponding to the failure of k network elements (links and nodes) $e_1, \ldots, e_k$ in that order.

At step 1220, a variable n is set equal to one (i.e., n=1) and a network topology status indicator set equal to a no_failure condition.

At step 1230, the method initializes a maximum number of wavelengths required to satisfy the primary communication paths in the no_failure case.

At step 1240, the method modifies the topology and deletes any demands based on a failure $e_n$. The demands are deleted only if the failure $e_n$ is a node failure, and then only the demands that terminate on the failed node are deleted.

At step 1250, the method solves a path-ordering integer problem to minimize capacity required in the cards network. Referring to box 1250B, this problem may be solved using the known CPLEX program or any commercial combinatorial optimization solver, the utilization of which depends upon the applied sharing policy as follows: (1) preemption or no preemption of unaffected demands for backup of a higher class demand; (2) working reuse or backup reuse only; (3) stratified or non-stratified sharing; and/or (4) with or without protection release.

At step 1260, the method updates the maximum link wavelengths required if any links require more of wavelengths than previously indicated within the database.

At step 1270, a determination is made as to whether any wavelength circuit working paths affected by a failure of $e_n$ have yet to be processed (i.e., is n=k?). If additional WC working paths affected by a failure of $e_n$ have yet to be processed, then the variable n is incremented at step 1280 and steps 1240-1270 are repeated for each affected additional WC working path. Otherwise the method 1200 exits.

Referring to box 1200-OUT, the method 1100 produces/updates a database indicative of the maximum primary and protection wavelengths required on each link by the DB and WS demands for the particular k-failure scenario f.

Figure 13:
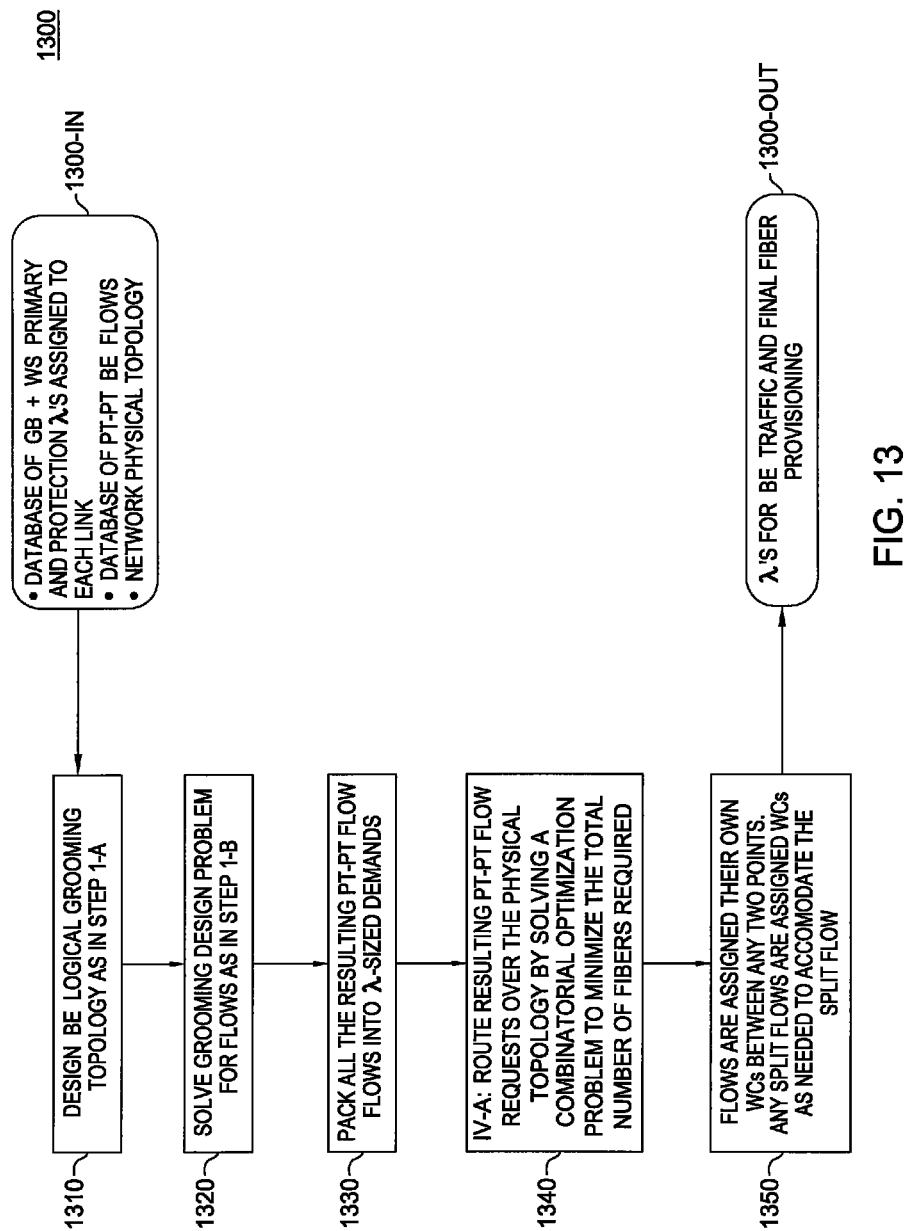
FIG. 13 depicts a flow diagram of a method for best effort (BE) traffic grooming and routing.

FIG. 13 depicts a flow diagram of a method for best effort (BE) traffic grooming and routing. The method 1300 of FIG. 13 is suitable for use in, illustratively, step 250 of the method 200 of FIG. 2.

Referring to box 1300-IN, the method 1300 uses/receives a database GB and WS primary protection wavelengths assigned to each link, a database of point-to-point best effort flows and information pertaining to the network physical topology.

At step 1310, the method designs a best effort logical grooming topology such as depicted above with respect to step 330 of the method 300 of FIG. 3. It is noted by the inventors that the BE grooming topology may be simplified in that less connectivity may be used, since there is no need for protection against grooming node failures.

At step 1320, the method solves a grooming design problem for flows such as depicted above with respect to step 340 of the method 300 of FIG. 3. The inventors note that the grooming design problem for flows may alternatively be addressed using the INDT packing method previously described with respect to the method 400 of FIG. 4.

At step 1330, the method packs all the resulting point-to-point flows into wavelength-sized demands. This packing may be accomplished using integer roundup or more sophisticated packing algorithms with IP flows, such as described in more detail above with respect to 440 of the method 400 of FIG. 4.

At step 1340, the method routes resulting point-to-point flow requests over the physical topology by solving a combinatorial optimization problem to minimize the total number of fibers required. This optimization problem may be solved using the CPLEX program. The inventors note that the optimization problem comprises a multi-commodity flow problem, but with integer fiber capacities and a desire to minimize a total number of fibers used. From a cost basis, a first fiber is considered free in that it is necessary anyway.

At step 1350, best effort flows are assigned their own wavelength circuits between any two points. Any split flows are assigned wavelength circuits as needed to accommodate the split flow.

Referring to box 1300-OUT, the method 1300 produces/updates a database indicative of the wavelengths for best effort traffic and associated final fiber provisioning.

Although various embodiments that incorporate the teachings of the present invention have been shown and described in detail herein, those skilled in the art can readily devise many other varied embodiments that still incorporate these teachings.

What is claimed is:

1. A method of provisioning a network allowing path protection of protected services, the method comprising:
   creating a logical network topology for grooming guaranteed bandwidth (GB) traffic flows, the logical topology including high, medium and low traffic nodes;
   determining a routing solution of the GB traffic flows using the logical network topology to provide wavelength circuit (WC) requests for a threshold number of network-wide failures associated with GB traffic flows recovery; and
   adapting the logical network topology to a physical layer of the network to provide GB routing and protection in the physical layer.

2. The method of claim 1, wherein
said step of adapting comprises associating each of a plurality of logical layer demand with one or more physical layer path sets, where each path set comprises a primary path and one or more protection paths.

3. The method of claim 1, further comprising:
   determining a routing solution for best effort (BE) traffic flows using the logical network topology; and
   adapting the routing solution to the physical layer of the network to provide BE routing in the physical layer.

4. The method of claim 1, further comprising:
   determining, for each physical layer demand, a maximum backup capacity for each of a plurality of failure scenarios; and
   if a maximum backup capacity requires more than a threshold loading level on a key link, repeating said step of adapting using one or more of alternate path weights, different path sets and different path ordering.

5. The method of claim 3, further comprising:
   determining, for each physical layer demand, a maximum backup capacity for each of a plurality of failure scenarios; and
   if a maximum backup capacity requires more than a threshold loading level on a key link, repeating said step of adapting using one or more of alternate path weights, different path sets and different path ordering.

6. The method of claim 1, further comprising:
   assigning primary and protection wavelength circuits to each GB link;
   assigning primary and protection wavelength circuits to any wavelength service (WS);
   determining, for each physical layer demand, a maximum backup capacity for each of a plurality of failure scenarios; and
   if a maximum backup capacity requires more than a threshold loading level on a key link, repeating said step of adapting using one or more of alternate path weights, different path sets and different path ordering.

7. The method of claim 1, further comprising:
   assigning primary and protection wavelength circuits to each GB link;
   assigning primary and protection wavelength circuits to any wavelength service (WS);
   assigning wavelength circuits to each BE link;
   determining, for each physical layer demand, a maximum backup capacity for each of a plurality of failure scenarios; and
   if a maximum backup capacity requires more than a threshold loading level on a key link, repeating said step of adapting using one or more of alternate path weights, different path sets and different path ordering.

8. The method of claim 1, wherein:
   each said high traffic nodes is fully meshed with the other high traffic nodes;
   each said medium traffic nodes is dual connected to a plurality of nearest neighbor high traffic nodes; and
   each of said low traffic nodes three is connected to at least one nearest neighbor high traffic node and at least one nearest neighbor medium traffic node.

9. The method of claim 1, wherein said network comprises a packet-over-optical mesh network including multiple network layers.

10. A computer readable medium containing a program which, when executed by a processor, performs method of provisioning a network allowing path protection of protected services, the method comprising:
   creating a logical network topology for grooming guaranteed bandwidth (GB) traffic flows, the logical topology including high, medium and low traffic nodes;
   determining a routing solution of the GB traffic flows using the logical network topology to provide wavelength circuit (WC) requests for a threshold number of network-wide failures associated with GB traffic flows recovery; and
   adapting the logical network topology to a physical layer of the network to provide GB routing and protection in the physical layer.

* * * * *